(12) United States Patent
Ataie

(10) Patent No.: US 12,028,114 B2
(45) Date of Patent: *Jul. 2, 2024

(54) METHOD AND SYSTEM FOR PERFORMING SIGNAL ANALYSIS USING A CORRELATIVE RECEIVER

(71) Applicant: Raytheon Company, Waltham, MA (US)

(72) Inventor: Vahid Ataie, San Diego, CA (US)

(73) Assignee: Raytheon Company, Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,177

(22) Filed: May 10, 2023

(65) Prior Publication Data

US 2023/0283382 A1    Sep. 7, 2023

Related U.S. Application Data

(62) Division of application No. 17/681,629, filed on Feb. 25, 2022, now Pat. No. 11,742,953.

(60) Provisional application No. 63/154,550, filed on Feb. 26, 2021.

(51) Int. Cl.
*H04B 10/2575*    (2013.01)
*H04B 10/50*    (2013.01)
*H04B 10/61*    (2013.01)

(52) U.S. Cl.
CPC ..... *H04B 10/6161* (2013.01); *H04B 10/2575* (2013.01); *H04B 10/505* (2013.01); *H04B 2210/25* (2013.01)

(58) Field of Classification Search
None
See application file for complete search history.

(56) References Cited

U.S. PATENT DOCUMENTS

| 7,609,972 B2 * | 10/2009 | Cunningham | ..... H04B 10/1127 398/118 |
| 8,295,706 B2 * | 10/2012 | Cunningham | ....... H04B 10/112 398/131 |
| 9,825,701 B2 * | 11/2017 | Juarez | .................. H04B 10/112 |

(Continued)

OTHER PUBLICATIONS

Ezra et al., Coherent detection in optical fiber systems, OSA, 2008 (Year: 2008).*

*Primary Examiner* — Jai M Lee

(57) ABSTRACT

An apparatus includes a tunable optical carrier source configured to generate a tunable optical carrier and a fixed wavelength optical carrier source configured to generate a fixed wavelength optical carrier. The apparatus also includes first and second optical modulators configured to modulate the tunable optical carrier and the fixed wavelength optical carrier based on first and second of multiple input signals. The apparatus further includes a delay element configured to delay the modulated tunable optical carrier, first and second optical detectors coupled to the delay element, and third and fourth optical modulators coupled to the first and second optical detectors. In addition, the apparatus includes a wavelength division demultiplexer optically coupled to the third and fourth optical modulators, a plurality of optical 90-degree hybrid elements optically coupled to the wavelength division demultiplexer, and a plurality of optical detectors optically coupled to corresponding ones of the optical 90-degree hybrid elements.

20 Claims, 5 Drawing Sheets

(56) References Cited

U.S. PATENT DOCUMENTS

| | | | |
|---|---|---|---|
| 10,139,699 B2* | 11/2018 | DeSalvo | G02F 1/21 |
| 10,411,810 B2* | 9/2019 | Kuo | H04B 10/616 |
| 10,630,391 B1* | 4/2020 | LaGasse | H04B 10/50577 |
| 10,735,127 B1* | 8/2020 | Chen | H04J 14/0223 |
| 10,917,173 B2* | 2/2021 | Kingsbury | H04B 7/18513 |
| 11,005,565 B1* | 5/2021 | Mitchell | H04B 10/1123 |
| 11,137,627 B2* | 10/2021 | Ataie | G01B 9/02002 |
| 11,356,173 B2* | 6/2022 | Esman | H04B 10/00 |
| 11,374,654 B2* | 6/2022 | Morton | H04B 10/25759 |
| 11,375,146 B2* | 6/2022 | Schultz | H04N 25/583 |
| 11,575,447 B2* | 2/2023 | Ataie | H04B 10/00 |
| 11,901,949 B2* | 2/2024 | Ataie | H04B 10/503 |
| 2021/0036777 A1* | 2/2021 | Ben Moshe | G01S 3/786 |
| 2022/0278754 A1* | 9/2022 | Ataie | H04B 10/556 |

* cited by examiner

METHOD AND SYSTEM FOR PERFORMING SIGNAL ANALYSIS USING A CORRELATIVE RECEIVER

CROSS-REFERENCE TO RELATED APPLICATIONS AND PRIORITY CLAIM

This application claims priority under 35 U.S.C. § 120 as a divisional of U.S. patent application Ser. No. 17/681,629 filed on Feb. 25, 2022, which claims priority under 35 U.S.C. § 119(e) to U.S. Provisional Patent Application No. 63/154,550 filed on Feb. 26, 2021. The contents of both applications are hereby incorporated by reference in their entirety for all purposes.

This application is also related to U.S. patent application Ser. No. 17/681,623 filed on Feb. 25, 2022 and entitled "METHOD AND SYSTEM FOR PERFORMING SIGNAL ANALYSIS USING A HYBRID PHOTONIC-ELECTRONIC PROCESSOR." The contents of this application are also hereby incorporated by reference in their entirety for all purposes.

BACKGROUND OF THE INVENTION

Real-time signal analysis is strictly dictated by the waveform bandwidth. Current electronic processors allow for complex analysis for signals with bandwidth smaller than 1 GHz. The example of currently viable real-time electronic processing includes Fourier and Hilbert transforms, correlation, convolution, pattern matching, and cyclostationary analysis. To perform any of these, a physical signal must first be digitized, mandating the use of an analog-to-digital (ADC) convertor processor in the front-end. While a number of applications can be served by sub-GHz signal analysis, a number of important applications require real-time analysis of signals with bandwidth exceeding 1 GHz.

With the emergence of high-capacity wireless communication, spectral analysis of wideband radio-frequency signals, associated with military applications in the past, has emerged as one of the most important applications. Current 5G wireless infrastructure incorporates signaling in excess of 1 GHz, requiring real-time spectral analysis for the purposes of provisioning, network surveillance, security and traffic conflict resolution. In electronic warfare, higher-order spectral analysis of the contiguous radio-frequency (RF) band (e.g., 1 kHz-110 GHz) is dictated by a need to identify, intercept and geolocate any emitter and classify its operation. In light wave (e.g., fiber optic) communication, it is necessary to analyze channels with aggregate capacity exceeding 400 Gbit/sec in order to provide real-time security and reverse transmission penalties. Current electronic processors possess neither the precision nor speed to satisfy these applications, causing a need for improved methods and systems that can address analysis of wideband signals.

SUMMARY OF THE INVENTION

In accordance with various aspects of the present disclosure, embodiments of the present invention relate to methods and apparatus for correlative reception of radio-frequency signals.

In a first embodiment, an apparatus includes a tunable optical laser configured to provide a tunable optical carrier and a fixed wavelength laser comb source configured to provide an optical comb including a plurality of fixed wavelength optical carriers. The apparatus also includes a first optical modulator configured to modulate the tunable optical carrier with a first of two input signals, where the first optical modulator includes a single-sideband optical modulator. The apparatus further includes a second optical modulator configured to modulate the fixed wavelength optical carriers with a second of the two input signals. The apparatus also includes a dispersive element configured to provide a delay between the modulated tunable optical carrier and the modulated fixed wavelength optical carriers. The apparatus further includes a first optical detector coupled to the dispersive element, a second optical detector coupled to the dispersive element, a third optical modulator coupled to the first optical detector, and a fourth optical modulator coupled to the second optical detector. The apparatus also includes a wavelength division demultiplexer optically coupled to the third and fourth optical modulators and configured to transmit demultiplexed signals. In addition, the apparatus includes a plurality of optical 90-degree hybrid elements optically coupled to the wavelength division demultiplexer and a plurality of optical detectors, each of the plurality of optical detectors optically coupled to a corresponding one of the optical 90-degree hybrid elements.

In a second embodiment, an apparatus includes a tunable optical carrier source configured to generate a tunable optical carrier and a fixed wavelength optical carrier source configured to generate a fixed wavelength optical carrier. The apparatus also includes a first optical modulator configured to modulate the tunable optical carrier based on a first of multiple input signals and a second optical modulator configured to modulate the fixed wavelength optical carrier based on a second of the multiple input signals. The apparatus further includes a delay element configured to delay the modulated tunable optical carrier, a first optical detector coupled to the delay element, a second optical detector coupled to the delay element, a third optical modulator coupled to the first optical detector, and a fourth optical modulator coupled to the second optical detector. In addition, the apparatus includes a wavelength division demultiplexer optically coupled to the third and fourth optical modulators, a plurality of optical 90-degree hybrid elements optically coupled to the wavelength division demultiplexer, and a plurality of optical detectors each optically coupled to a corresponding one of the optical 90-degree hybrid elements.

In a third embodiment, a system includes a first antenna configured to receive a first incoming signal, a second antenna configured to receive a second incoming signal, a tunable optical carrier source configured to generate a tunable optical carrier, and a fixed wavelength optical carrier source configured to generate at least one fixed wavelength optical carrier. The system also includes a first optical modulator configured to modulate the tunable optical carrier based on the first incoming signal and a second optical modulator configured to modulate the at least one fixed wavelength optical carrier based on the second incoming signal. The system further includes a delay element configured to delay the modulated tunable optical carrier, a first optical detector coupled to the delay element, a second optical detector coupled to the delay element, a third optical modulator coupled to the first optical detector, and a fourth optical modulator coupled to the second optical detector. In addition, the system includes a wavelength division demultiplexer optically coupled to the third and fourth optical modulators, a plurality of optical 90-degree hybrid elements optically coupled to the wavelength division demultiplexer, and a plurality of optical detectors each optically coupled to a corresponding one of the optical 90-degree hybrid elements.

Numerous benefits are achieved by way of the present invention over conventional techniques. For example, embodiments of the present invention provide methods and systems for real-time processing of radiofrequency (RF) input signals which may have bandwidth larger than several hundred GHz. These and other embodiments of the invention, along with many of its advantages and features, are described in more detail in conjunction with the text below and attached figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete and will fully convey the full scope to those skilled in the art.

DETAILED DESCRIPTION OF THE INVENTION

The present invention relates generally to wideband signal analysis with a hybrid photonic-electronic processor. More particularly, embodiments of the present invention provide methods and systems directed at correlative reception of radio-frequency signals.

Figure 1:
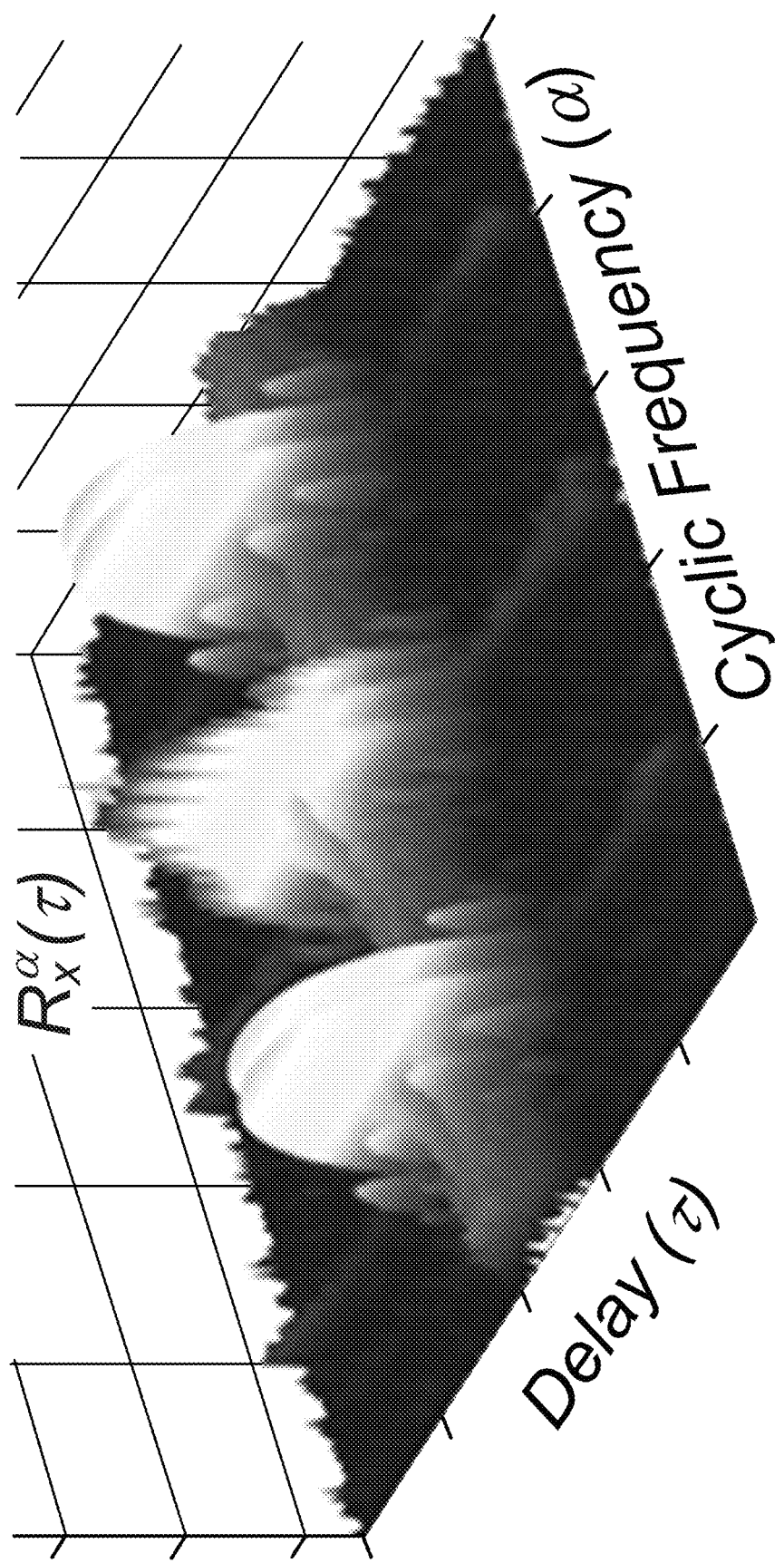
FIG. 1 is CAF table plot used to identify signal modulation, geolocate an emitter and define its velocimetry.

A correlative radio-frequency (RF) receiver is intended to generate a cross-ambiguity function (CAF), using two RF inputs x(t) and y(t).

$$R_\alpha^T = \int_{-T/2}^{T/2} x(t) \times y(t-\tau) e^{j2\pi\alpha t} dt \quad (1)$$

where $\tau$ is commonly referred to as signal delay and $\alpha$ is referred to as cyclic frequency. The bound (T) is referred to as the integration range, and, in practical applications, is typically much larger than the shortest cycle of the processed signal input. The CAF is represented in the form of a $\tau$-$\alpha$ table, shown in FIG. 1. Analysis of the CAF table allows for identification of modulation-specific signal features, emitter geolocation, and Doppler velocimetry of the emitter.

The Fourier transform of the CAF function is referred to as the spectral correlation function (SCF) and can be obtained by a single-step transformation from the known CAF function. In a conventional approach that utilizes computational electronics, the SCF is calculated by using successive Fast Fourier Transforms (FFTs) and spectral correlation. The CAF function is subsequently calculated by computing the inverse Fourier transform. The computational load associated with such an approach is impractical in the case when the input signal bandwidth is large. As an example, consider a 10 GHz wide RF input signal that needs to be resolved with 1 kHz precision. This means that the ITT must be computed over 10 GHz/1 kHz=$10^7$ spectral bins, requiring $10^7 \log_{10}(10^7) = 7 \times 10^7$ floating operations each millisecond ($7 \times 10^{10}$ FLOPS). This must be followed by correlation of spectral bins, requiring $10^7 \times 10^7 = 10^{14}$ multiplications during 1 millisecond (i.e., $10^{17}$ FLOPS). Such computational power is unattainable by most conventional electronic architectures and, when coupled with the memory requirement associated with CAF integration, eliminates wideband signals (e.g., with bandwidths substantially higher than 1 GHz) from being received by a correlative receiver. Recognizing this limitation, a purely computational approach to signal correlation and generation of CAF/SCF functions is replaced by physically assisted architecture according to embodiments of the present invention.

Figure 2:
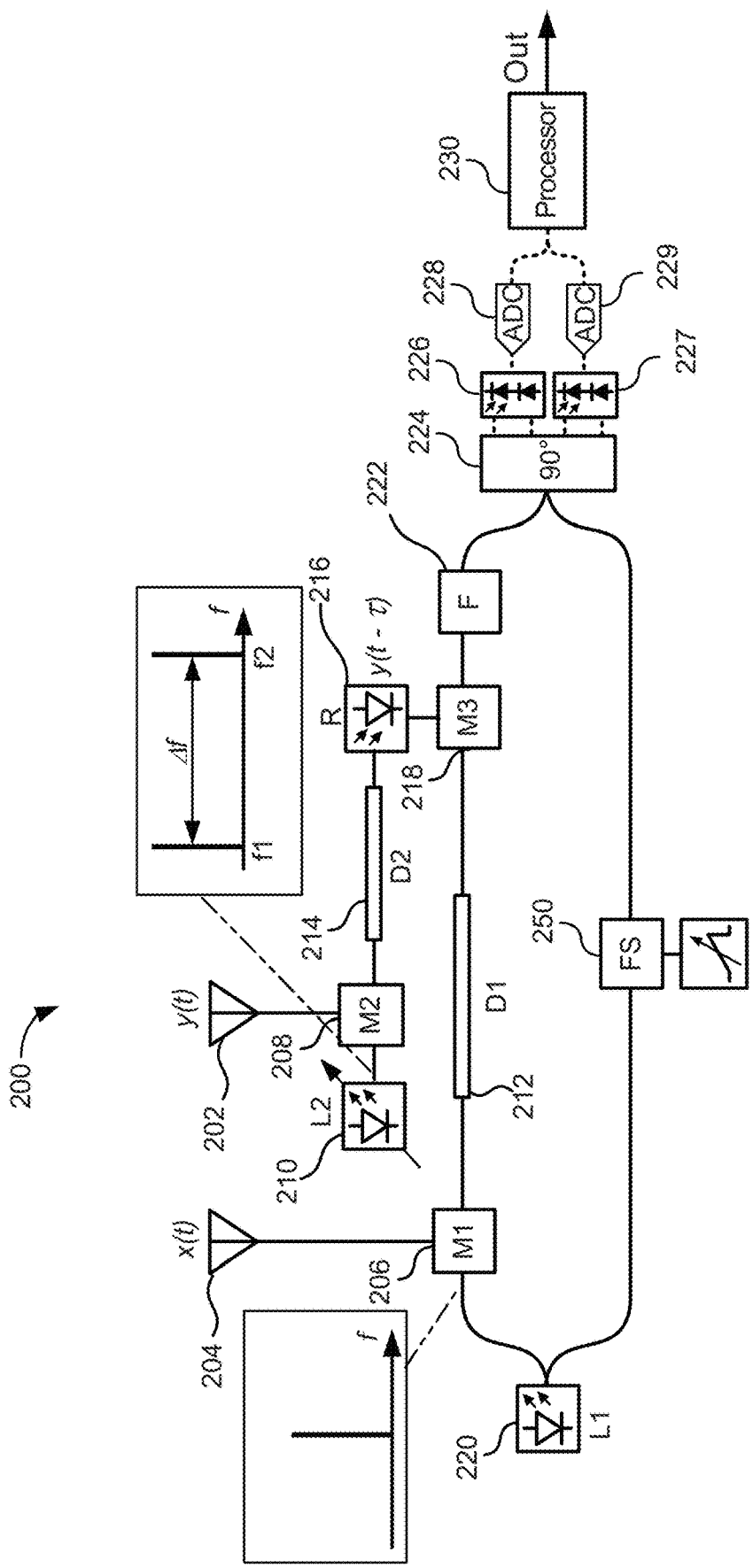
FIG. 2 is a simplified schematic diagram of a physically assisted correlative receiver according to an embodiment of the present invention.

FIG. 2 is a block diagram of a physically assisted correlative receiver 200 according to an embodiment of the present invention. The physically assisted correlative receiver 200 is used to assist the generation of CAF/SCF functions. The physically assisted correlative receiver 200 is implemented as a hybrid photonic-electronic processor that includes a front end dedicated to acquiring two arbitrary RF signals (e.g., a first RF signal y(t) and a second RF signal x(t)) and performing its operation in the photonic domain before converting the result to digital form and completing the processing chain.

The physically assisted correlative receiver 200 may receive radiofrequency (RF) input (e.g., the arbitrary signals x(t) and y(t)) through a first antenna 202 and a second antenna 204. As an example, the first antenna 202 and the second antenna 204 can receive RF signals having a bandwidth up to hundreds of GHz. The physically assisted correlative receiver 200 converts the inputs received by the first antenna 202 and second antenna 204 from the RF domain to the optical domain via optoelectronic modulators. The physically assisted correlative receiver 200 includes a first optoelectronic modulator 206, a second optoelectronic modulator 208, and a third optoelectronic modulator 218. The physically assisted correlative receiver 200 may further include a tunable laser 210; the output of the tunable laser (e.g., an optical carrier) is provided to the second optoelectronic modulator 208 using a suitable optical connection. As illustrated in FIG. 2, the tunable laser 210 is capable of tuning its center frequency over a frequency range $\Delta f$ that ranges from $f_1$ to $f_2$. The RF input y(t) of the second antenna 204 modulates the optical carrier generated by the tunable laser 210 via the second optoelectronic modulator 208, converting the RF input y(t) from the RF domain to the optical domain.

Referring to FIG. 2, a delay $\tau$ in the first RF signal y(t) is generated by transmitting the modulated optical carrier produced at the output of the second optoelectronic modulator 208 over a second dispersive line 214. The relative delay $\tau$ for frequencies, centered at $f_1$ and $f_2$, is defined by $$T = D \times L \times c \times \frac{\Delta f}{f^2},$$

where D is the dispersion of the second dispersive line 214, L is the length of the second dispersive line 214, c is the speed of light, f is the frequency, and $\Delta f$ is the frequency difference between $f_1$ and $f_2$. As an example, an L=1 km long, conventional dispersion compensating fiber that possesses a dispersion $D=5\times10^{-4}$ s/m$^2$ will induce a delay of τ=5 ns when a f=193 THz (i.e., a wavelength of 1550 nm) tunable laser is tuned over f=1250 GHz (i.e., 10 nm). The practical delay range of a processor using a fiber as a dispersion line is limited by the fiber loss=0.25 dB/km and the tunable range of the laser carrier. An acceptable loss (e.g., around 10 dB) and a common tunable range of a 1550 nm laser (i.e. approximately 100 nm) result in a viable delay range of 2000 ns. The delayed signal output (labeled as y(t−τ) in FIG. 1) of the second dispersive line 214 is then sent to a detector element 216. The detector element 216 will convert the delayed signal from the optical domain back to the RF domain. Thus, the embodiment illustrated in FIG. 2 utilizes the tunable laser 210, the second optoelectronic modulator 208, the second dispersive line 214, and the detector element 216 (e.g., an intensity detector) to implement a tunable delay line that delays the arbitrary first RF input y(t) to produce delayed y(t−τ) used to drive the third optoelectronic modulator 218.

The physically assisted correlative receiver 200 may further comprise a fixed-frequency laser 220. The output of the fixed-frequency laser (e.g., an optical carrier) may be split into two portions, with an upper portion being provided to the first optoelectronic modulator 206 using a suitable optical connection and a lower portion being provided to a frequency shifter 250. The second RF input x(t) received at the second antenna 204 may be converted from the RF domain to the optical domain by modulating the output of the fixed-frequency laser 220 via the first optoelectronic modulator 206. As a result, the optical signal output by the first optoelectronic modulator 206 carries the second RF input signal x(t). The modulated signal produced by the first optoelectronic modulator 206 is transmitted to the third optoelectronic modulator 218 via the first dispersive line 212. The frequency shifter 250 may be configured to shift the frequency of the fixed-frequency laser 220 by an arbitrary amount. This will act as a local oscillator for the system, used to detect the product that will be generated in the upper portion.

In the embodiment illustrated in FIG. 2, the first dispersive line 212 introduces a fixed delay to the optical signal that is received at the third optoelectronic modulator 218. The description provided herein assumes that the first dispersive line 212 is not utilized and that the second dispersive line 214 is designed and implemented in the absence of the first dispersive line 212. Thus, the first dispersive line 212 is not required to implement the processor functionality described herein and is inserted as an option to optimize the requirements associated with the first dispersive line 212.

At the third optoelectronic modulator 218, the output of the detector element 216 (RF signal y(t−τ)) is used as an RF drive input to modulate the second RF input x(t) received at the second antenna 204 resulting in the generation of the multiplication state x(t)×y(t−τ) residing on an optical carrier at the output of the third optoelectronic modulator 218, which is subsequently filtered using the filtering element 222.

The output of the third optoelectronic modulator 218 is combined with the optical carrier generated by the fixed-frequency laser 220 and sent to an optical 90-degree hybrid element 224. The optical 90-degree hybrid element 224 is configured to separate quadratures of the output of the third optoelectronic modulator 218. The output of the optical 90-degree hybrid element 224 is provided to the set of balanced detectors 226 and 227 in order to perform coherent optical-to-electrical conversion. The output of each balanced detector is subsequently digitized by a set of analog-to-digital conversion (ADC) elements 228 and 229 and provided to the backplane digital processor 230.

While the CAF function is partially generated in the physical domain, the output of the receiver is in digital form as defined by:

$$\int_{-T/2}^{T/2} x(t)y(t-\tau)e^{-2\pi\alpha t}dt \rightarrow \Sigma_{k=1}^{N}x(k\delta t)y(k\delta t-\tau)e^{-2\pi\alpha jk\delta t} \quad (2)$$

where discrete sampling corresponds to the output of an analog-to-digital (ADC) element 228. It can be recognized that the Fourier transform at the left side of this relation has a corresponding equivalent in the discrete domain:

$$\int_{-\frac{T}{2}}^{\frac{T}{2}} x(t)y(t-\tau)e^{-j2\pi\alpha t}dt = \quad (3)$$

$$F(x(t)y(t-\tau)) \rightarrow \sum_{k=1}^{n} x(k\delta t)y(k\delta t-\tau)e^{-j2\pi\alpha k\delta t} = DFT(x(k\delta t)y(k\delta t-\tau))$$

where DFT refers to the discrete Fourier transform, ordinarily implemented via Fast Fourier Transform (FFT) algorithm. The description below provides a specific implementation that is aimed at topology simplification.

Figure 3:
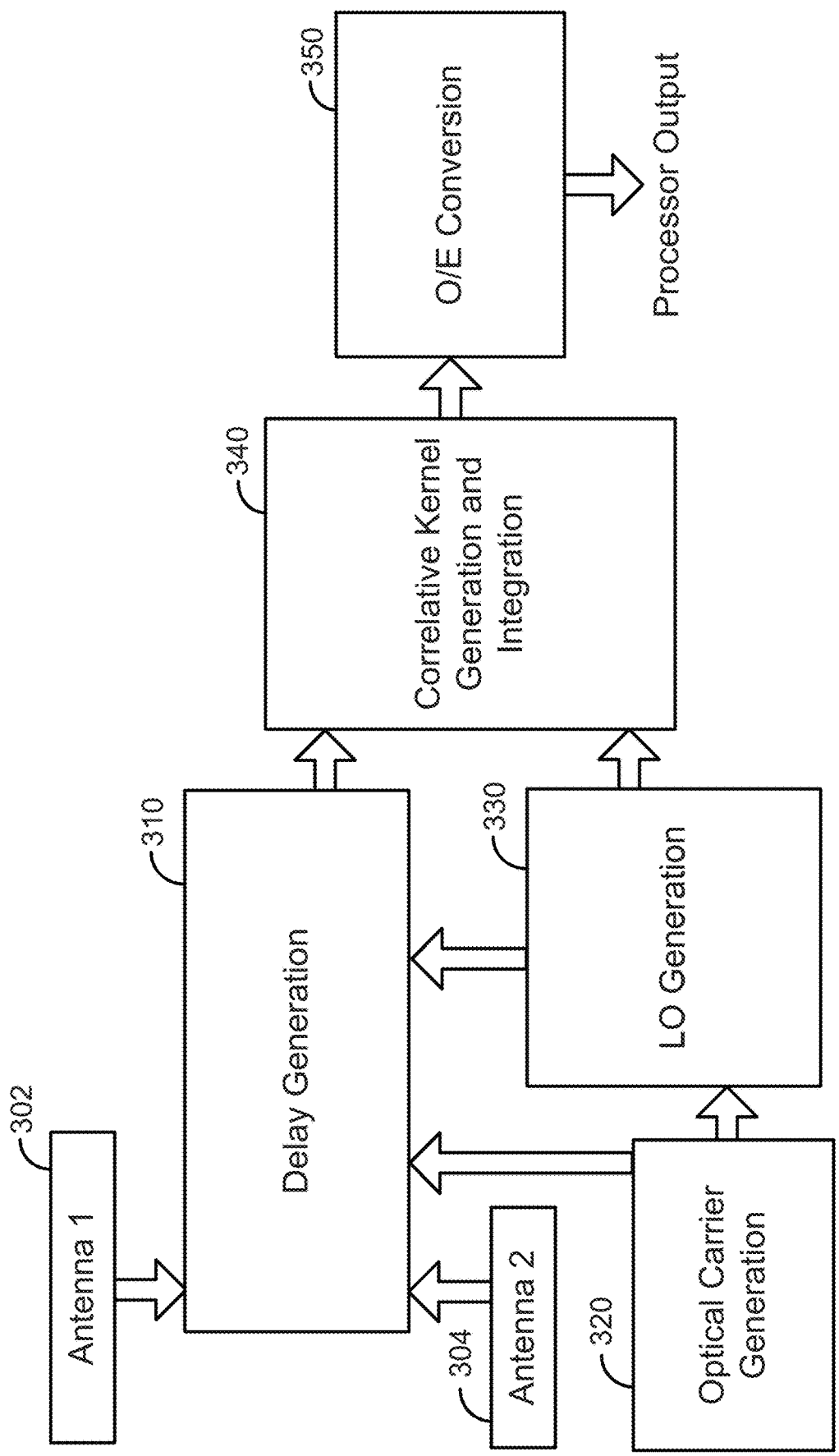
FIG. 3 is a block diagram illustrating the functionalities of the modules of a correlative receiver according to an embodiment of the present invention.

FIG. 3 is a simplified block diagram illustrating the functionalities of the correlative receiver according to an embodiment of the present invention. The correlative receiver is constructed from modular blocks, allowing each subsystem to be realized independently and interface with any other block via RF/optical interconnect. The receiver may include a first antenna 302 and a second antenna 304 to receive input signals (e.g., the first antenna 202 and the second antenna 204). The receiver may further include a Delay Generation Module 310 used to create relative delay in the inputs (e.g., the first optoelectronic modulator 206, the second optoelectronic modulator 208, the tunable laser 210, the first dispersive line 212, the second dispersive line 214, the detector element 216). Optical Carrier Generation Module 320 may include an optical carrier generator (e.g., the fixed-frequency laser 220) which may then be used to modulate the input of the second antenna 304. LO Generation Module 330 may contain components (e.g., the frequency shifter 250) which act as a local oscillator used to change the frequency of the second antenna input and used to detect a multiplication state of the two RF inputs. Correlative Kernel Generation and Integration Module 340 may generate the kernel of the CAF function (e.g., the multiplication state of the two RF inputs x(t)×y(t−τ)). O/E Conversion Module 350 may contain components (e.g., the optical 90-degree hybrid element 224, balanced detector 226 and ADC element 228) to convert the signal from optical to electronic form to be used by a processor (e.g., the backplane digital processor 230).

Figure 4:
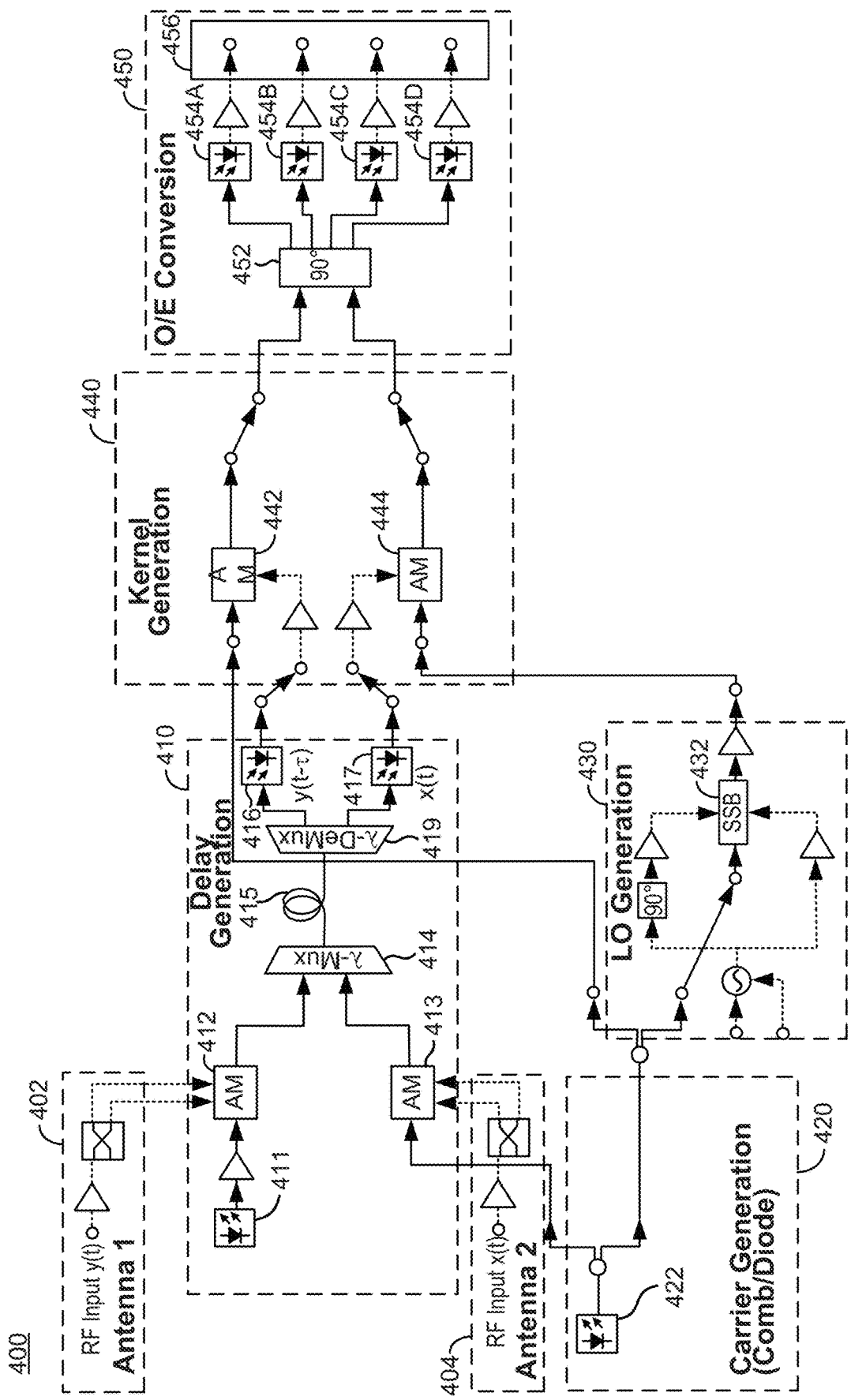
FIG. 4 is a block diagram showing the implementation of the modules of the correlative receiver according to an embodiment of the present invention.

FIG. 4 is a block diagram showing the implementation of the modules of the correlative receiver according to an embodiment of the present invention. The correlative receiver 400 can have a first antenna 402 and a second antenna 404 to receive input signals. The input signals can include a first RF input y(t) received at first antenna 402 and a second RF input x(t) received at second antenna 404. In some embodiments, the separation between the antennas is negligible, but the signals may be substantially different (e.g., achieved by increasing the distance between antennas, or feeding them with different physical inputs).

The Delay Generation Module 410 may contain a tunable laser 411 generating an optical carrier that can be tuned to different wavelengths. The Delay Generation Module 410 may also include a first optoelectronic modulator 412 configured to modulate the optical carrier received from the tunable laser 411 with the RF input y(t) received from the first antenna 402. The Delay Generation Module 410 may further include a second optical modulator 413 configured to modulate an optical carrier received from a fixed wavelength laser 422 with the RF input x(t) received from the second antenna 404. As illustrated in FIG. 4, fixed wavelength laser 422 can provide a single wavelength or a comb of wavelengths.

Both modulated signals, now in the optical domain, are multiplexed using wavelength-division multiplexer 414, subsequently passed through dispersive line 415, and separated by wavelength-division demultiplexer 419 to be received by incoherent (e.g., direct detection) receivers. The wavelength-division demultiplexer 419 may be configured to send the delayed first RF input to a first incoherent receiver 416 configured to receive the delayed RF input. The wavelength-division demultiplexer 419 may also send the second input signal to a second incoherent receiver 417 configured to receive the second RF input.

The Carrier Generation Module 420 may contain a fixed wavelength laser 422 to generate an optical signal, i.e. an optical carrier, to be split and sent to the Delay Generation Module 410 and to the Local Oscillator (LO) Generation Module 430. The Generation Module 430 may contain a single-sideband modulator 432 to create a local oscillator. This allows the optical carrier received from the fixed wavelength laser 422 (with an optical frequency centered at an unmodulated laser emission frequency) to act as a local oscillator (LO) to allow beating with a modulated sideband at the first incoherent receiver 416 or the second incoherent receiver 417. As a consequence, both the phase and amplitude of the antenna input are encoded and preserved before being used for second stage modulation.

The Kernel Generation Module 440 may contain a third, null-biased, optical modulator 442. To avoid phase tracking and subsequent matching, the Kernel Generation may encode the first delayed RF input and the second RF input onto a single-drive optical modulator. This means the first delayed RF input being sent to third, null-biased, optical modulator 442 may modulate the optical carrier received from the fixed wavelength laser 422. The output of the third, null-biased, optical modulator 442 may then be sent to the O/E Conversion Module 450. Similarly, the second RF input may be sent to a fourth, null-biased, optical modulator 444 to modulate the optical carrier O/E received from the fixed wavelength laser 422. The output of the fourth, null-biased, optical modulator 444 may then be sent to the O/E Conversion Module 450. In one of the implementations, one of the signals can be modulated onto the frequency shifted copy of the optical carrier, providing means for heterodyne reception.

O/E Conversion Module 450 may contain a 90-degree hybrid 452 configured to separate quadratures (e.g., an orthogonal decomposition may be performed by the 90-degree hybrid 452 to separate any signal into orthogonal components known as quadratures; an example of such a method is separating the real and imaginary components in base band signals) of the outputs of the third, null-biased, optical modulator 442 and the fourth, null-biased, optical modulator 444. The quadratures may be fed into a plurality of optical detectors 454A, 454B, 454C, and 454D. The set of optical detectors 454A-454D may be configured to convert optical signal quadratures to electrical signals. The electrical signals may then be fed to an analog-to-digital converter (ADC) 456, which may include a plurality of analog-to-digital elements operable to convert the electrical signal received into a digital form that may be processed further.

In the O/E Conversion Module 450, the combination of the 90-degree hybrid 452 and the set of balanced I/Q (coherent) receivers 454A-454D allows retrieval of phase and amplitude of the kernel (e.g., the delayed signal product x(t)×y(t−τ)). The implementation shown in FIG. 4 implies that final integration, utilized to generate the CAF, is completed in the digital domain. The sampling speed of the analog-to-digital conversion and processing rate of a digital backplane processor that may process the digital output of the system dictate the largest acquirable bandwidth of the input signals received by the antennas. When this rate is exceeded, the topology shown in FIG. 4 is easily scaled by replacing the fixed wavelength laser 422 and adding additional coherent receivers.

Thus, as illustrated in FIGS. 2 and 4, embodiments of the present invention can utilize modulators operated in cascade as well as modulators operated in parallel (e.g., third, null-biased, optical modulator 442 and fourth, null-biased, optical modulator 444).

Figure 5:
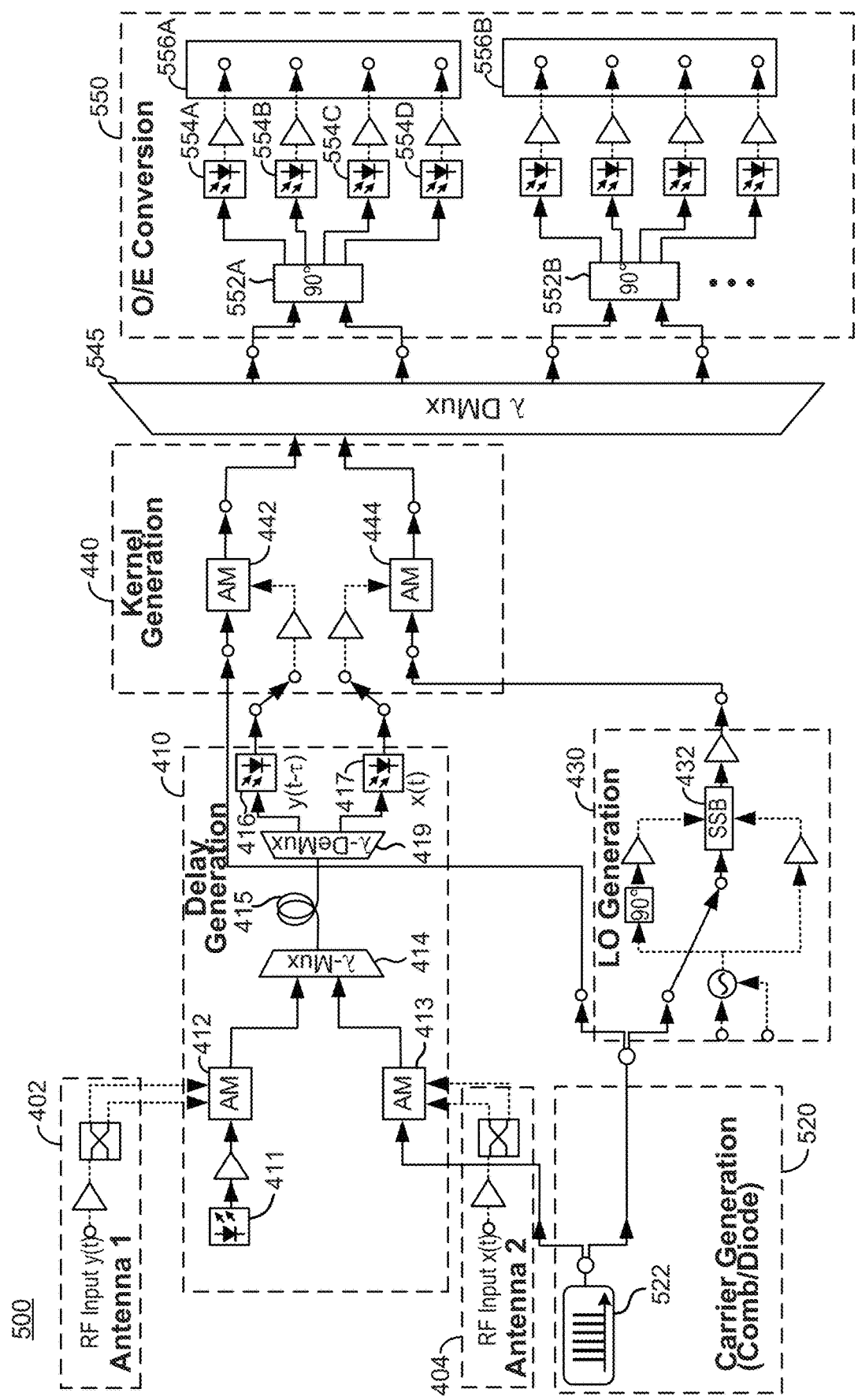
FIG. 5 is a block diagram showing implementation of the modules of a parallelized correlative receiver according to an embodiment of the present invention.

FIG. 5 is a block diagram of an implementation of the modules of a parallelized correlative receiver according to an embodiment of the present invention. The parallelized correlative receiver 500 illustrated in FIG. 5 shares some common elements with the correlative receiver 400 illustrated in FIG. 4 and the description provided in relation to FIG. 4 is applicable to FIG. 5 as appropriate. The fixed wavelength laser 422 illustrated in FIG. 4 is replaced by a fixed wavelength carrier comb 522 possessing multiple (N), mutually coherent carriers. In this implementation, each optical carrier of the fixed wavelength carrier comb 522 provided by Carrier Generation Module 520 acts as an independent carrier to be modulated by the RF inputs.

The output of the Kernel Generation Module 440 is sent to a wavelength demultiplexer 545, which may be configured to separate modulated optical carriers of the fixed wavelength carrier comb 522 to be routed to a specific coherent detector from a plurality of coherent detectors (e.g., it may be sent to a first coherent detector 554A) to complete the functions of the O/E Conversion Module 550 in a similar manner as that illustrated in FIG. 4. The outputs produced by the wavelength demultiplexer 545 are delivered to a plurality of 90-degree hybrid elements 552 (e.g., a first 90-degree hybrid element 552A, a second 90-degree hybrid element 552B, etc.). The process may then continue in a similar manner illustrated in FIG. 4. The wavelength demultiplexer 545 enables the parallelized correlative receiver 500 to process RE inputs having much higher bandwidths. As an example, if a single analog-to-digital conversion element 556A and an associated backplane processor can support instantaneous bandwidth Δf the aggregate bandwidth of the parallelized correlative receiver 500 is scaled linearly as N×Δf, where N represents the number of utilized optical carriers.

One of ordinary skill in the art will appreciate that other modifications to the apparatuses and methods of the present disclosure may be made for implementing various applications of the hybrid photonic-electronic processor without departing from the scope of the present disclosure.

The examples and embodiments described herein are for illustrative purposes only. Various modifications or changes in light thereof will be apparent to persons skilled in the art.

There are to be included within the spirit and purview of this application, and the scope of the appended claims which follow.

What is claimed is:

1. An apparatus comprising:
a tunable optical laser configured to provide a tunable optical carrier;
a fixed wavelength laser comb source configured to provide an optical comb including a plurality of fixed wavelength optical carriers;
a first optical modulator configured to modulate the tunable optical carrier with a first of two input signals, the first optical modulator comprising a single-sideband optical modulator;
a second optical modulator configured to modulate the fixed wavelength optical carriers with a second of the two input signals;
a dispersive element configured to provide a delay between the modulated tunable optical carrier and the modulated fixed wavelength optical carriers;
a first optical detector coupled to the dispersive element;
a second optical detector coupled to the dispersive element;
a third optical modulator coupled to the first optical detector;
a fourth optical modulator coupled to the second optical detector;
a wavelength division demultiplexer optically coupled to the third and fourth optical modulators and configured to transmit demultiplexed signals;
a plurality of optical 90-degree hybrid elements optically coupled to the wavelength division demultiplexer; and
a plurality of optical detectors, each of the plurality of optical detectors optically coupled to a corresponding one of the optical 90-degree hybrid elements.

2. The apparatus of claim 1, wherein the two input signals are independent signals.

3. The apparatus of claim 1, wherein:
the fixed wavelength optical carriers are split into two paths; and
one of the two paths is frequency-shifted with respect to another of the two paths.

4. The apparatus of claim 1, wherein the third optical modulator comprises a null-biased optical modulator configured to modulate the fixed wavelength optical carriers using an output of the first optical detector.

5. The apparatus of claim 1, wherein the fourth optical modulator comprises a null-biased optical modulator configured to modulate the fixed wavelength optical carriers using an output of the second optical detector.

6. The apparatus of claim 1, wherein the optical 90-degree hybrid elements are configured to separate quadratures of an output of the third optical modulator.

7. The apparatus of claim 1, wherein each of the optical 90-degree hybrid elements is configured to produce four output quadratures.

8. The apparatus of claim 7, wherein each of the plurality of optical detectors is configured to convert two of the four output quadratures into electrical signals.

9. An apparatus comprising:
a tunable optical carrier source configured to generate a tunable optical carrier;
a fixed wavelength optical carrier source configured to generate a fixed wavelength optical carrier;
a first optical modulator configured to modulate the tunable optical carrier based on a first of multiple input signals;
a second optical modulator configured to modulate the fixed wavelength optical carrier based on a second of the multiple input signals;
a delay element configured to delay the modulated tunable optical carrier;
a first optical detector coupled to the delay element;
a second optical detector coupled to the delay element;
a third optical modulator coupled to the first optical detector;
a fourth optical modulator coupled to the second optical detector;
a wavelength division demultiplexer optically coupled to the third and fourth optical modulators;
a plurality of optical 90-degree hybrid elements optically coupled to the wavelength division demultiplexer; and
a plurality of optical detectors each optically coupled to a corresponding one of the optical 90-degree hybrid elements.

10. The apparatus of claim 9, wherein the first optical modulator comprises a single-sideband optical modulator.

11. The apparatus of claim 9, wherein the delay element comprises a dispersive element.

12. The apparatus of claim 9, wherein the fixed wavelength optical carrier source comprises a fixed wavelength laser comb source configured to generate an optical comb comprising a plurality of fixed wavelength optical carriers including the fixed wavelength optical carrier.

13. The apparatus of claim 9, wherein:
the fixed wavelength optical carrier is split into multiple paths; and
one of the multiple paths is frequency-shifted with respect to another of the multiple paths.

14. The apparatus of claim 9, wherein the third optical modulator comprises a null-biased optical modulator configured to modulate the fixed wavelength optical carrier based on an output of the first optical detector.

15. The apparatus of claim 9, wherein the fourth optical modulator comprises a null-biased optical modulator configured to modulate the fixed wavelength optical carrier based on an output of the second optical detector.

16. The apparatus of claim 9, wherein the optical 90-degree hybrid elements are configured to separate quadratures of an output of the third optical modulator.

17. The apparatus of claim 9, wherein each of the optical 90-degree hybrid elements is configured to produce four output quadratures.

18. The apparatus of claim 17, wherein each of the plurality of optical detectors is configured to convert two of the four output quadratures into electrical signals.

19. The apparatus of claim 9, wherein the fourth optical modulator comprises a null-biased optical modulator configured to modulate a local oscillator (LO) signal based on an output of the second optical detector.

20. A system comprising:
a first antenna configured to receive a first incoming signal;
a second antenna configured to receive a second incoming signal;
a tunable optical carrier source configured to generate a tunable optical carrier;
a fixed wavelength optical carrier source configured to generate at least one fixed wavelength optical carrier;
a first optical modulator configured to modulate the tunable optical carrier based on the first incoming signal;

a second optical modulator configured to modulate the at least one fixed wavelength optical carrier based on the second incoming signal;
a delay element configured to delay the modulated tunable optical carrier;
a first optical detector coupled to the delay element;
a second optical detector coupled to the delay element;
a third optical modulator coupled to the first optical detector;
a fourth optical modulator coupled to the second optical detector;
a wavelength division demultiplexer optically coupled to the third and fourth optical modulators;
a plurality of optical 90-degree hybrid elements optically coupled to the wavelength division demultiplexer; and
a plurality of optical detectors each optically coupled to a corresponding one of the optical 90-degree hybrid elements.

* * * * *